United States Patent [19]

Nelson

[11] Patent Number: 4,593,873

[45] Date of Patent: Jun. 10, 1986

[54] PORTABLE HAMPER WITH FOOT PEDAL OPERATED COVER

[75] Inventor: Ralph E. Nelson, Newport Beach, Calif.

[73] Assignee: Winfield Corp., San Diego, Calif.

[21] Appl. No.: 587,828

[22] Filed: Mar. 9, 1984

[51] Int. Cl.[4] .............................................. B65B 67/12
[52] U.S. Cl. ..................... 248/98; 220/263; 248/99
[58] Field of Search ...................... 248/98, 97, 99, 129; 220/263

[56] References Cited

U.S. PATENT DOCUMENTS

| | | | |
|---|---|---|---|
| 1,135,810 | 4/1915 | Jones | 220/263 |
| 1,791,766 | 2/1931 | Scharf | 220/263 X |
| 3,008,604 | 11/1961 | Garner | 220/263 X |
| 3,088,425 | 5/1963 | LaRue | 220/263 X |
| 4,150,764 | 4/1979 | Anderson | 220/263 |
| 4,227,283 | 10/1980 | Mathewson et al. | 16/273 |
| 4,318,520 | 3/1982 | Walker | 248/98 |
| 4,354,543 | 10/1982 | Bogner | 248/98 X |

Primary Examiner—J. Franklin Foss
Assistant Examiner—David L. Talbott
Attorney, Agent, or Firm—Charles H. Schwartz; Ellsworth R. Roston

[57] ABSTRACT

A portable hamper for supporting a pliant bag having sides, a closed bottom and an upper portion having an open top, including, a frame having structure for holding the upper portion of the bag with the top spread open and with the remainder of the bag extending downward from the upper portion, a cover pivotably mounted at a top position at one end of the frame and with the cover in a first pivotal position covering the open top of the bag and with the cover in a second pivotal position exposing the open top of the bag, and a pedal actuated linkage including a pedal movably mounted to a bottom portion at the other end of the frame and at least one arm extending diagonally across the side of the frame and coupled to the pedal and the cover to provide pivotable movement of the cover from the first position to the second position upon movement of the pedal from an upper position to a downward position.

16 Claims, 6 Drawing Figures

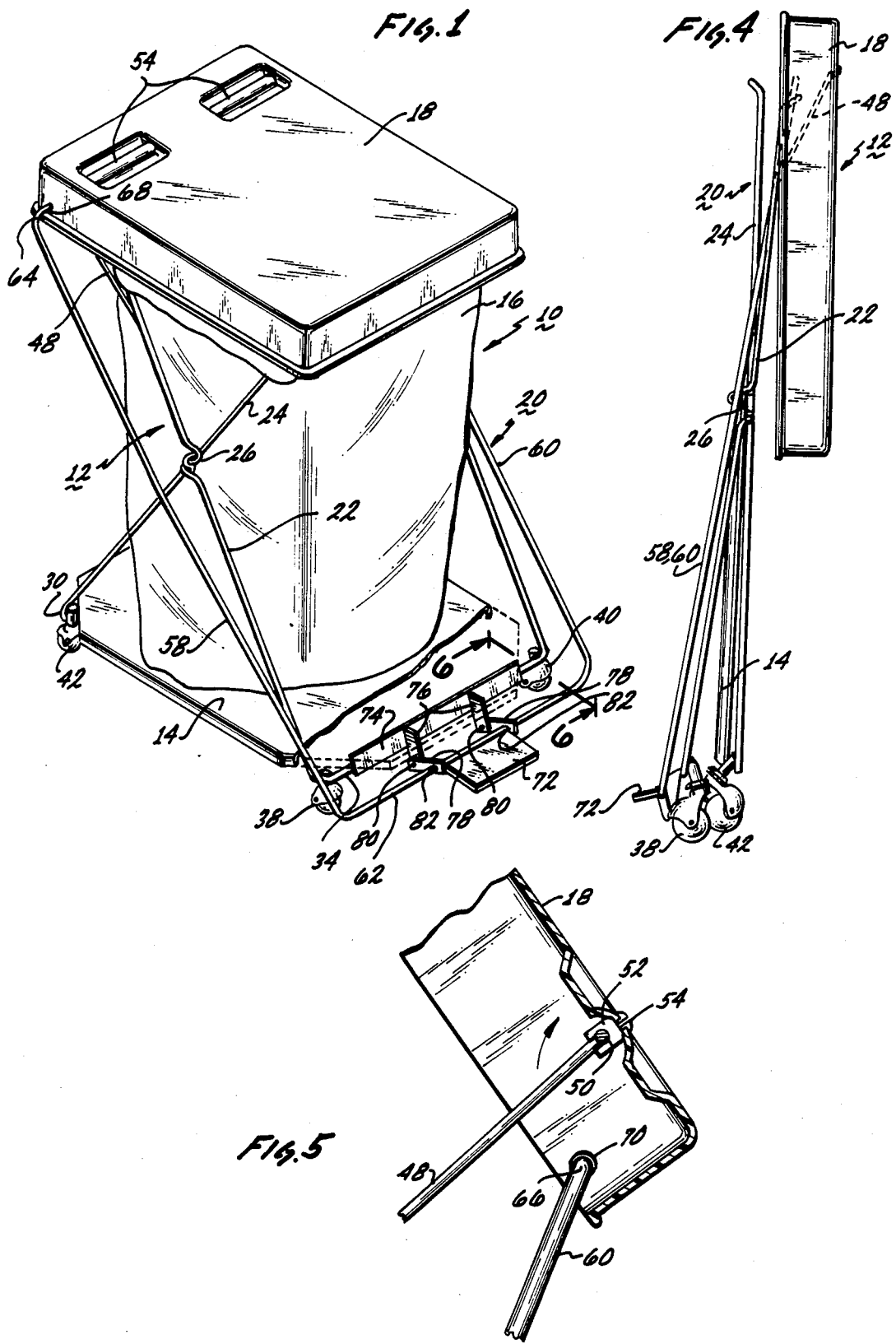

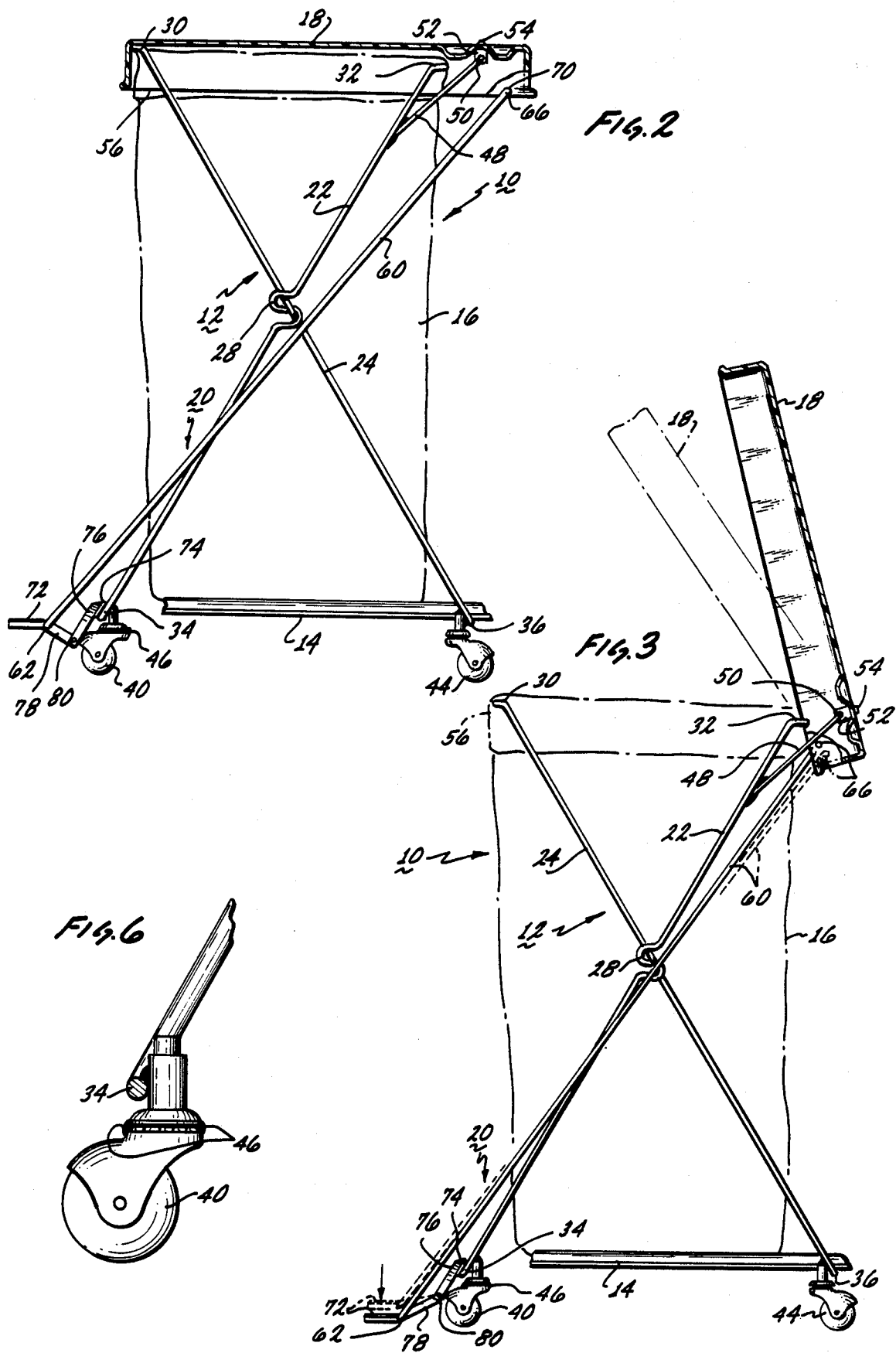

PORTABLE HAMPER WITH FOOT PEDAL OPERATED COVER

BACKGROUND OF THE INVENTION

1. Field of the Invention

The present invention relates to a portable hamper and specifically to a portable hamper with a foot pedal actuated cover.

2. Description of the Prior Art

The present invention has particular utility for use in hospitals and nursing homes and is used as a portable hamper for the storage, movement and ultimate disposition of various types of waste material. Hampers that are used in hospitals and nursing homes must in general be portable, easy to clean and use and must be versitile so as to be useful for the storage of a variety of different types of waste material.

As an example, portable hampers must be capable of being used for materials such as soiled linen, trash, infectious linen, infectious surgical supplies, diapers and other types of waste which must be collected from a particular location and then transported to areas for either disposal or renewal. It is desirable that the hampers are normally covered except when the material is being put into the hamper bag. Prior art hampers have been used to provide for the above collection, movement and disposition and one such prior art hamper is shown in U.S. Pat. No. 4,354,543 issued Oct. 19, 1982 and listing Paul Bogner as the inventor.

The prior art patent listed above discloses a portable hamper having a hamper frame to support a pliant hamper bag and with the hamper movable through the use of casters located at the bottom of the frame. A lower support tray is positioned to hold the frame sections open and with the lower tray also serving as a bottom support for the hamper bag and as a container to retain spare bags. The hamper frame includes upper cross members which serve as the supports on which the hamper bag is hung. A cover, large enough to cover the open bag, fits down around the upper end of the bag and encloses the upper end of the bag and the upper cross members of the frame. The cover may include spring clip fasteners which clip onto a cross member of the frame and allow the cover to be pivoted around the frame so as to expose the open end of the hamper bag to allow the bag to receive waste material.

In the prior art patent, the cover may be clipped to either one of the two cross members or to a third cross member located outside of the two cross members. In one embodiment of the prior art patent, the cover would automatically close each time the cover is opened due to a portion of the cover engaging a side of the bag. In a second embodiment of the prior art patent, the cover may be maintained in an open position. The two embodiments for the prior art patent allows the portable hamper of the prior art to be used in a variety of situations depending upon the clipping of the cover. However, with both of the prior art embodiments, the cover had to be opened by hand.

In the first prior art embodiment, the user of the hamper would open the cover with one hand and place the material in the bag with the other. The cover would contact the side of the bag so that the cover would automatically close, If the material to be placed in the bag had to be handled with both hands then the user of the hamper would have to position the cover to form the second prior art embodiment so that the cover would stay open. The user of the hamper would then open the cover and leave the cover in the open position and then use both hands to place the material in the open bag. Once the material has been placed in the open bag, the cover would then be closed by hand.

It can be seen therefore, that the prior art hamper although useful for a variety of situations also had a serious limitation in that the cover had to be opened by hand and that in certain situations, the cover might be left in the open position even though it would be desirable for the cover to automatically close.

SUMMARY OF THE INVENTION

The present invention is an improvement on the prior art hampers and is specifically an improvement on the prior art hamper shown in U.S. Pat. No. 4,354,543. The present invention includes a foot pedal activated cover to provide for the cover to be opened by foot pressure and allow the user of the hamper to have both hands free for placing waste material into the hamper bag. Once foot pressure is removed from the pedal the cover automatically returns to the closed position to cover the open top of the hamper bag.

The portable hamper of the present invention is made of a simple, collapsable frame formed by two X-shape side members and with the upper and lower ends of the side members interconnected by cross members. The X-shape side members are pivotably interconnected at a crossing point so that the frame may be collapsed with a scissors action. A bottom tray holds the frame members open and with the upper opening of the frame serving to support a hamper bag. Specifically, a hamper bag may be folded over the upper cross members to have the bag hang downward between the frame. Caster members are attached to the lower corners of the frame members so that the entire hamper may be easily rolled across the floor during the collection of waste material.

The entire structure described above for the hamper is relatively light in weight and would not normally allow for the foot operation of a cover such as a cover pivotably attached to a cross member. In particular, a foot operated structure would normally tilt the entire hamper during operation unless the hamper bag already contained a considerable amount of material. The present invention provides for a foot pedal actuated cover which is simple in structure, easy in operation and which does not provide for a tilting of the hamper during operation. In addition, the cover automatically closes once pressure is removed from the foot pedal.

The cover of the present invention includes fasteners such as spring clips attached at the under surface of the cover. The hamper includes an extension to one of the frame members and with the extension also including a cross member located outside the bag opening and with the clips attached to this extension cross member. A U-shaped member having two arms and a cross member has its open ends pivotably fastened to the cover at side positions further outside the bag opening than the pivotable attachment of the cover to the frame. The closed end or cross member of the U-shaped member supports a foot pedal and with an interconnecting link between the foot pedal and a bottom portion of the frame. Pressure on the foot pedal provides for downward movement of the U-shaped member.

The downward movement of the U-shaped member produces a pivoting action of the cover from a closed position to an open position. The pivot points for the cover and the points of downward force on the cover both occurs at positions considerably back from the normal center of gravity of the hamper. Also the force on the foot pedal occurs at a point to the front of the center of gravity of the hamper. Since the points of force on the cover are outside the center of gravity in opposite positions, these forces tend to counterbalance each other so that the hamper will not tip during operation of the cover. To further insure that the hamper does not tip, the casters located adjacent to the foot pedal are pivotably fixed to extend in the same direction as the foot pedal to provide for maximum stability of the hamper during operation of the foot pedal. In addition, the various linkages of the foot pedal structure provide for the foot pedal being in a flat, horizontal position during the operation of the foot pedal. This position tends to minimize any rotational component of force which might produce tipping of the hamper.

All of the above structure is provided in a relatively light, portable, collapsable hamper which is universal in use and simple in operation. The user of the portable hamper can easily wheel the hamper to the desired collection point, press the foot pedal to open the cover and have both hands free for the disposing of any waste material into the hamper bag. Once pressure is removed from the foot pedal the cover by its own weight, will return to the closed position.

BRIEF DESCRIPTION OF THE DRAWINGS

A clearer understanding of the invention will be had with reference to the following descriptions and drawings wherein;

FIG. 1 is an isometric view of a portable hamper with foot pedal actuated cover of the present invention;

FIG. 2 is a side view of the hamper of FIG. 1 with the cover closed;

FIG. 3 is a side view of the hamper of FIG. 1 with the cover in partially open and fully open positions;

FIG. 4 is a side view showing the portable hamper of FIG. 1 fully collapsed for storage;

FIG. 5 illustrates a detail of the attachment of the cover to the frame of the hamper and;

FIG. 6 illustrates a front caster fixed in the desired position to prevent tilting of the hamper during operation of the cover.

DESCRIPTION OF THE PREFERRED EMBODIMENT

As shown in FIG. 1, a hamper 10 includes a frame 12, a lower tray 14, a cover 18 and a bag 16. A foot pedal cover actuating structure 20 is interconnected between the frame 12 and cover 18. The hamper structure shown in FIG. 1 is lightweight, easily collapsable and relatively inexpensive to produce and may be maintained clean without significant effort. FIG. 4 illustrates the frame 12 and foot pedal structure 20 collapsed for storage into a relatively flat structure and the cover 18 and tray 14 may be also maintained in a flat position with the collapsed frame.

The frame 12 is composed of two sub-frames 22 and 24 each formed of round bar material which is bent into a substantially rectangular shape. The sub-frames fit within each other so that the first sub-frame 22 is a little narrower than the second sub-frame 24. The two sub-frames 22 and 24 are interconnected at two points 26 and 28 located on opposite sides. In particular, each sub-frame has a conformation formed in the mid-region of both of its side members at the location of the two points 26 and 28. Specifically, the conformation at each side member of the rectangular frame member 22 is U-shaped and the conformation at each side of the rectangular frame member 24 is S-shaped.

In the assembled frame 12, the S-shaped conformations are threaded through the U-shaped conformations to form a pivot by which the two rectangular sub-frames 22 and 24 are pivotably interconnected. The use of the combination of the S-shaped and U-shaped conformations provides a connection wherein the two rectangular sub-frames 22 and 24 may be pivoted with respect to each other and with the side members of the rectangular sub-frame 22 lying within the side members of the rectangular sub-frame 24.

The S-shaped and U-shaped conformations in the side members of the two sub-frames permit only limited relative pivotable movement from the collapsed position shown in FIG. 4 to the open position shown in FIGS. 1, 2 and 3. In the open position, the conformations interfere to prevent further pivoting as can be seen in FIGS. 2 and 3, so that the side members at each side of the rectangular frame have the appearance of an X-shape. Therefore, when the entire frame 12 is opened it can be considered to comprise two X-shape sides, the outer ends of which are interconnected by cross members designated as upper cross members 30 and 32 and lower cross members 34 and 36.

The frame 12 includes four caster wheels. Specifically, caster wheels 38 and 40 are mounted at the opposite ends of the lower cross member 34 of the frame 22. Two additional caster wheels 42 and 44 are mounted at the opposite ends of the lower cross member 36 of the frame 24. The casters 40 and 42 are fixed in position to always face in the direction shown in FIGS. 1, 2 and 3. This is accomplished as shown in FIG. 6 by welding these casters, such as the caster 40, at a plurality of positions 46 so that the caster cannot swivel and must always face in the direction shown. This fixing of the casters 38 and 40 so that they cannot swivel provides for added stability during the operation of the foot pedal actuated cover. The casters 42 and 44 can freely swivel so that the manuverability of the hamper is not limited.

The frame 12 additionally includes a further extension member 48 permanently affixed to the upper portion of the sub-frame 22, such as by welding, and with the member 48 including a cross frame 50 extending across the frame and generally parallel to the other cross members of the frame. The additional member 48 and specifically the cross member portion 50 is used to support the cover 18 for pivoting from the closed to the open position shown in FIGS. 2 and 3.

The cross members 30 and 32 operate to support the bag 16. Specifically, these two cross members, when in the open position, are substantially horizontal and with the cross member 30 being in a slightly higher plane than the cross member 32. The cross member 50 is also substantially horizontal and parallel to the cross members 30 and 32 and with the cross member 50 being in approximately the same horizontal plane as the cross member 30. The cover member 18 is clipped to the cross member 50 using at least a pair of clip members 52 and with the cover maintained in a horizontal plane across the cross members 30 and 50 and slightly spaced above the cross member 32.

The clips 52 may be formed of a spring metal material but is preferably formed of a low friction plastic material such as nylon. The clips are attached in position to the cover 18 by integral split fastener portions 54 forced through openings in the cover 18. It can be seen that the member 48, and in particular, the cross member 50 has a smaller diameter than the diameter of the other frame members. This smaller diameter, in combination with the use of a low friction material for the clips 52, provides for a smooth, relatively frictionless rotation of the cover member between the closed and open positions.

The bag 16 may be assembled on the frame in the manner shown in FIGS. 2 and 3. Specifically, the bag extends down between the two X-shaped side portions of the complete frame 12 and with the bag suspended from the pair of cross members 30 and 32. The upper edge of the bag is drawn over these two cross members and then downward to form a skirt 56 of bag material to lock the bag in position. In practice, the downwardly extending skirt 56 need only be several inches wide to insure that the bag will be retained on the frame, even when the bag is fully loaded. Additionally, the bag 16 is sufficiently long so that its lower end engages and rests on the tray 14 which is positioned between the lower cross members 34 and 36.

The foot pedal cover actuating structure 20 is formed by a pair of long arms 58 and 60 interconnected by a cross member 62 to form a U-shaped member. The ends of the arms 58 and 60 are bent inward at positions 64 and 66 and are fit into openings 68 and 70 in the sides of the cover 18. A foot pedal 72 is permanently attached to the cross member 62, such as by welding, and with the foot pedal 72 extending in a substantially horizontal plane when the frame 12 is in the open position and during the various positions of operation of the foot pedal as shown in FIGS. 1, 2 and 3.

A pivot linkage interconnects the cross member 34 of frame 22 to the cross member 62. Specifically, a flat support bar 74 is permanently attached to the cross member 34, such as by welding, to provide for a support surface for the linkage. A pair of downwardly extending arm members 76 are permanently attached to the support bar 74 again, by means such as welding. A pair of double pivot links 78 are pivotably interconnected between the arms 76 and the cross member 62.

In particular, the links 78 are pivotably attached to the arms 76 such as by pin members 80 to allow for pivoting of the link 78 around the arms 76. The links 78 include openings 82 to freely receive the cross member 62 so that the links 78 and cross member 62 may rotate relative to each other. The particular operation of the cover member in accordance with a depression of the foot pedal 72 may be seen with reference to FIGS. 2 and 3 which illustrate the rotation of the cover 18 from a closed to an open position. Specifically, as shown in FIG. 2, the pedal 72 is in an upward horizontal position at which time the links 78 are at approximately a forty-five degree (45°) angle and extending upwardly from the arms 76. The arms 58 and 60 extend in a diagonal position across the sides to allow the cover 18 to be in a closed position covering the opening of the bag 16.

When downward pressure is applied to the foot pedal 72, as shown by the arrow in FIG. 3, the horizontal position of the foot pedal 72 is lowered and the links 78 are rotated through a horizontal position to a position where they extend downward. The cover actuating arms 58 and 60 are also pulled downward along a diagonal because the cross member 62 is captured within the openings 82 in the links 78. The downward movement of the arms 58 and 60 produces a pivoting of the cover 18 upward and around a pivot axis passing through the pivot attachment points formed by the clips 52 snapped on the cross member 50.

The arms 58 and 60 are not only pulled diagonally downward, but they also tend to rotate as shown by the dotted and full lined positions in FIG. 3. As the arms are pulled downward, the cover 18 is rotated upward to expose the open end of the bag 16 and with the maximum open position as shown in the full line position in FIG. 3. The maximum position for the cover 18 occurs when the foot pedal 72 substantially contacts the floor. It can be seen that in the maximum open position for the cover 18, the cover still has an acute angular position relative to the top of the portable hamper. Therefore, when pressure on the foot pedal is removed, the weight of the cover 18 forces the cover to automatically rotate downward to return the cover to the closed position shown in FIG. 2. It is to be appreciated that the user of the hamper need not open the cover 18 to the full open position but may control the cover to be in any open position in between the closed position shown in FIG. 2 and the fully opened position shown in solid line in FIG. 3.

The present invention therefore provides for a portable hamper with a foot pedal actuated cover and with the hamper being relatively lightweight, inexpensive and simple in construction. Moreover, even though the hamper is lightweight, the foot pedal cover actuating structure is stable in operation and does not provide for the hamper tipping over when the foot pedal is pressed downward. The stability is achieved by positioning the cover actuating arms diagonally across the sides of the hamper from a first position to the rear of the hamper to a second position to the front of the hamper. The actuating force providing pivoting of the cover occurs at one end of the hamper and is transferred from the downward force applied to the foot pedal at the other end of the hamper. These two forces are on opposite sides of the center of gravity of the hamper to thereby reduce the tendency of the hamper to tilt.

Also, the casters at the front of the hamper are locked in position to extend to the front and increase the stability of the hamper in the foot pedal area. Additionally, the friction at the pivot points of the cover is minimized through the use of a small diameter for the cross member cooperating with clips made of low friction material. All of the above provides for a smooth operation when the foot pedal is depressed to produce a pivotable opening of the cover to expose the open end of the bag. The foot pedal actuating of the cover thereby allows the user of the portable hamper of the present invention both hands free to pick up and dispose of the waste material in the bag. Upon the release of the foot pedal, the cover automatically returns to a closed position to insure that, except when material is being placed in the hamper, the hamper is always closed.

Although the present invention has been described with reference to a particular embodiment it is to be appreciated that various adaptations and modifications may be made and the invention is only to be limited by the appended claims.

I claim:
1. A portable hamper for supporting a pliant bag having sides, a closed bottom and an upper portion having an open top, including,
   a frame including means for holding the upper portion of the bag with the top spread open and with the remainder of the bag extending downward from the upper portion, a cover pivotably mounted at a top position at one end of the frame and with the cover in a first pivotal position covering the open top of the bag and with the cover in a second pivotal position exposing the open top of the bag, a pedal actuated linkage including a pedal movably mounted to a bottom portion at the other end of the frame and at least one arm extending diagonally across the side of the frame and coupled to the pedal and the cover to provide pivotable movement of the cover from the first position to the second position upon movement of the pedal from an upper position to a downward position, and the arm including a cross member extending across the bottom of the frame and with the pedal directly attached to the cross member and extending horizontally outward from the cross member and with the pedal linkage including a pivot link extending between and pivotably attached to the frame and the cross member to provide for the pedal remaining in a substantially horizontal position upon movement of the pedal from the upper position to the downward position.

2. The portable hamper of claim 1 wherein the frame includes at least two upper cross members to form the means for holding the upper portion of the bag with the tip spread open and additionally including a third upper cross member located outside the two upper cross members and with the cover pivotably mounted on the third upper cross member.

3. The portable hamper of claim 2 wherein the third upper cross member is formed from material having a smaller cross section than the at least two upper cross members.

4. The portable hamper of claim 3 wherein the cover includes at least one clip member attached to the third upper cross member to pivotably mount the cover to the frame and with the clip formed of a low friction material.

5. The portable hamper of claim 1 wherein the cover includes at least one clip member attached to an upper portion of the frame to pivotably mount the cover to the frame and with the clip formed of a low friction material.

6. The portable hamper of claim 1 additionally including a plurality of casters located at bottom positions of the frame to allow the hamper to freely roll and with two of the casters positioned adjacent to and located to either side of the pedal and with the two casters fixed to extend in the same direction as the pedal in increase the stability of the hamper during actuating movement of the pedal.

7. The portable hamper of claim 6 wherein the frame includes a cross member located outside the means for holding the upper portion of the bag with the top spread open and with the cross member located at the end of the frame opposite to the location of the pedal actuated linkage.

8. The portable hamper of claim 1 wherein the pedal actuated linkage includes a pair of diagonal arms on each side of the frame and with the cross member extending between the arms and with each arm pivotably attached to the cover on opposite sides of the cover.

9. In a portable hamper, a frame including a pair of frame members spaced to permit mounting a pliant bag on the frame to hang downward between the pair of frame members, the frame including a third frame member disposed at one end of the pair of frame members, a cover of a size to overlie the pair of frame members and any bag assembled thereon and the third frame member, the cover including fastening means for pivotal attachment of the cover to the third frame member such as to be pivotal from a first position covering the pair of frame members, and any bag assembled thereon, to a second position in which the space between the frame members, and any bag assembled thereon, is uncovered, a pedal actuated linkage including a pedal movable mounted to a bottom of the frame and at least one arm extending diagonally across the pair of frame members and coupled to the pedal and the cover to provide translation of any force applied to the pedal to the cover to produce pivoting of the cover from the first position to the second position, and the arm including a cross member extending across the bottom of the frame and with the pedal directly attached to the cross member and extending horizontally outward from the cross member and with the pedal linkage including a pivot link extending between and pivotably attached to the frame and the cross member to provide for the pedal remaining in a substantially horizontal position upon movement of the pedal.

10. In the portable hamper of claim 9 wherein the pair of frame members each include and upper cross member to mount the pliant bag.

11. In the portable hamper of claim 10 wherein the third frame member is formed from material having a smaller cross section than the pair of frame members.

12. The portable hamper of claim 11 wherein the fastening means includes at least one clip member attached to the third frame member and with the clip formed of a low friction material.

13. The portable hamper of claim 9 wherein the fastening means includes at least one clip member attached to frame member and with the clip formed of a low friction material.

14. In the portable hamper of claim 9 additionally including a plurality of casters located at bottom positions of the frame to allow the hamper to freely roll and with two of the casters positioned adjacent to and located to either side of the pedal and with the two casters fixed to extend in the same direction as the pedal in increase the stability of the hamper during opening of the cover.

15. In the portable hamper of claim 14 wherein the third frame member located at one end of the pair of frame members is located at the end of the frame opposite to the location of the pedal actuated linkage.

16. In the portable hamper of claim 9 wherein the pedal actuated linkage includes a pair of diagonal arms on each side of the frame and with the cross member extending between the arms and with each arm pivotably attached to the cover on opposite sides of the cover.

* * * * *